United States Patent
Poelma et al.

(10) Patent No.: US 11,859,057 B2
(45) Date of Patent: Jan. 2, 2024

(54) PARTIALLY REVERSIBLE THERMOSETS USEFUL FOR RECYCLING

(71) Applicant: CARBON, INC., Redwood City, CA (US)

(72) Inventors: Justin Poelma, Sunnyvale, CA (US); Rick Hubertus Nicolas Curvers, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/905,779

(22) PCT Filed: Mar. 11, 2021

(86) PCT No.: PCT/US2021/021866
§ 371 (c)(1),
(2) Date: Sep. 7, 2022

(87) PCT Pub. No.: WO2021/183741
PCT Pub. Date: Sep. 16, 2021

(65) Prior Publication Data
US 2023/0125915 A1    Apr. 27, 2023

Related U.S. Application Data

(60) Provisional application No. 62/988,586, filed on Mar. 12, 2020.

(51) Int. Cl.
*C08J 11/08* (2006.01)
*C08J 11/18* (2006.01)

(52) U.S. Cl.
CPC ............... *C08J 11/08* (2013.01); *C08J 11/18* (2013.01); *C08J 2375/02* (2013.01); *C08J 2375/04* (2013.01)

(58) Field of Classification Search
USPC .......................................................... 521/49
See application file for complete search history.

(56) References Cited

U.S. PATENT DOCUMENTS

| 3,213,058 A | 10/1965 | Boyle et al. |
| 3,694,389 A | 9/1972 | Levy |

(Continued)

FOREIGN PATENT DOCUMENTS

| EP | 0525578 A1 | 2/1993 |
| EP | 2580262 A1 | 4/2013 |

(Continued)

OTHER PUBLICATIONS

Biao Zhang et al: "Reprocessable thermosets for sustainable three-dimensional printing", Nature Communications, vol. 9, No. 1, May 8, 2018 (May 8, 2018), (Year: 2018).*

(Continued)

*Primary Examiner* — Terressa Boykin
(74) *Attorney, Agent, or Firm* — Myers Bigel, P.A.

(57) ABSTRACT

Provided herein is a method of recycling reactive prepolymers from additively manufactured articles or recovered coating material that comprises a crosslinked polymer formed from a single-cure resin comprising a reactive blocked prepolymer and a crosslinker, by forming and recovering a regenerated reactive prepolymer. Light-polymerizable resins, methods of making recyclable objects from such resins, and methods for sustainable manufacturing are also provided.

20 Claims, 2 Drawing Sheets

Partially reversible thermoset

Insoluble crosslinked material

(56) References Cited

U.S. PATENT DOCUMENTS

| | | |
|---|---|---|
| 5,236,637 A | 8/1993 | Hull |
| 5,391,072 A | 2/1995 | Lawton et al. |
| 5,529,473 A | 6/1996 | Lawton et al. |
| 6,861,475 B2 | 3/2005 | Ilenda et al. |
| 6,916,867 B2 | 7/2005 | Gugumus |
| 7,157,586 B2 | 1/2007 | Wood et al. |
| 7,279,505 B2 | 10/2007 | Phelan et al. |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |
| 7,892,474 B2 | 2/2011 | Shkolnik et al. |
| 8,088,245 B2 | 1/2012 | Lutz et al. |
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,598,606 B2 | 3/2017 | Rolland et al. |
| 9,796,693 B2 | 10/2017 | Bossaert et al. |
| 2013/0202392 A1 | 8/2013 | Morimoto et al. |
| 2013/0292862 A1 | 11/2013 | Joyce |
| 2013/0295212 A1 | 11/2013 | Chen et al. |
| 2015/0184039 A1 | 7/2015 | Lutz et al. |
| 2015/0240113 A1 | 8/2015 | Pratt et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2018/0126630 A1 | 5/2018 | Panzer et al. |
| 2018/0243976 A1 | 8/2018 | Feller |
| 2018/0290374 A1 | 10/2018 | Willis et al. |

FOREIGN PATENT DOCUMENTS

| | | |
|---|---|---|
| WO | 2015164234 A1 | 10/2015 |
| WO | 2016133759 A1 | 8/2016 |
| WO | 2016145182 A1 | 9/2016 |
| WO | 2018226943 A1 | 12/2018 |
| WO | 2020055609 A1 | 3/2020 |

OTHER PUBLICATIONS

International Search Report and Written Opinion corresponding to PCT/US2021/021866; dated Aug. 13, 2021 (20 pages).

Janusziewicz, Rima, et al., "Layerless fabrication with continuous liquid interface production", PNAS, 113(42), 2016, pp. 11703-11708.

Liu, Wen-Xing, et al., "Oxime-Based and Catalyst-Free Dynamic Covalent Polyurethanes", J. Am. Chem. Soc., 139 (25), 2017, pp. 8678-8684.

Tumbleston, John R., et al., "Continuous liquid interface production of 3D Objects", Science, 347(6228), 2015, pp. 1349-1352.

Zhang, Biao, et al., "Reprocessable thermosets for sustainable three-dimensional printing", Nature Communications, 9(1), 2018, pp. 1-7.

\* cited by examiner

US 11,859,057 B2

PARTIALLY REVERSIBLE THERMOSETS USEFUL FOR RECYCLING

CROSS REFERENCE TO RELATED APPLICATIONS

This application is a 35 U.S.C. § 371 national phase application of International Application Serial No. PCT/US2021/021866, filed Mar. 11, 2021, which claims the benefit of U.S. Provisional Application No. 62/988,586, filed Mar. 12, 2020, the disclosures of which are incorporated by reference herein.

FIELD OF THE INVENTION

The present invention concerns additive manufacturing in general, and particularly concerns resins suitable for producing additively manufactured products with components that can be recycled.

BACKGROUND OF THE INVENTION

In conventional additive manufacturing techniques (often referred to as "3D printing"), construction of a three-dimensional object is performed in a step-wise or layer-by-layer manner by sequentially exposing a light-polymerizable resin to patterned light. Generally referred to as "stereolithography," numerous examples are known, including those described in U.S. Pat. No. 5,236,637 to Hull (see, e.g., FIGS. 3-4) and 7,892,474 to Shkolnik. Additional examples are given in U.S. Pat. Nos. 5,391,072 and 5,529,473 to Lawton, U.S. Pat. No. 7,438,846 to John, U.S. Pat. No. 8,110,135 to El-Siblani, and U.S. Patent Application Publication Nos. 2013/0292862 to Joyce and 2013/0295212 to Chen et al.

Unfortunately, additive manufacturing techniques have generally been slow, and have long been known to produce parts with a limited range of mechanical properties, frequently rendering such products unsuitable for real world use beyond simple prototyping.

More recently, techniques referred to as "continuous liquid interface production" (or "CLIP") have been developed. These techniques enable the rapid production of three-dimensional objects, preferably in a layerless manner, by which the parts may have desirable structural and mechanical properties. See, e.g., J. DeSimone et al., U.S. Pat. Nos. 9,211,678; 9,205,601; and 9,216,546; J. Tumbleston, et al., *Continuous liquid interface production of 3D Objects*, Science 347, 1349-1352 (2015), and R. Janusziewcz et al., *Layerless fabrication with continuous liquid interface production*, Proc. Natl. Acad. Sci. USA 113, 11703-11708 (2016). The increasing availability of additive manufacturing techniques for the manufacture of real-world articles, beyond prototyping, creates a need for new sustainable chemistry approaches in this field.

SUMMARY OF THE INVENTION

Provided herein according to some embodiments is a method of recycling additively manufactured articles (e.g., dental models) or recovered coating material, comprising: (a) providing a preformed article, or recovered coating material, wherein said article or coating material is produced by the process of light polymerizing a single-cure resin in an additive manufacturing (or coating) process, said resin comprising or consisting essentially of: (i) a reactive blocked prepolymer; (ii) a crosslinker (e.g., in an amount of from 1% to 5% by weight); (iii) a photoinitiator; (iv) optionally a reactive diluent; (v) optionally a light absorber; (vi) optionally pigments and/or dyes; and (vii) optionally at least one filler; said preformed article or recovered coating material comprised of at least 70, 80 or 90 percent by weight of a crosslinked polymer, said crosslinked polymer consisting essentially of said reactive blocked prepolymer, said crosslinker, and said reactive diluent when included, in light polymerized, cross-linked, thermoset form; (b) comminuting said preformed article or recovered coating material into a particulate material (e.g., by grinding such as cryo-milling, shredding, chopping, or pelletizing); and (c) combining said particulate material (e.g., in an amount of from 1, 2 or 4 percent by weight to 20, 25, or 30 percent by weight, or more) with a reactive blocking agent or reactive capping agent to form a mixture, and heating said mixture (e.g., to a temperature of from 40, 60 or 70° Celsius to 90, 100, or 120° Celsius, or more) for a time sufficient to form a regenerated reactive prepolymer.

In some embodiments, the method further includes (d) extracting said regenerated reactive prepolymer from said mixture into a solvent.

In some embodiments, the regenerated reactive prepolymer is a reactive blocked prepolymer (e.g., an ABPU).

In some embodiments, the reactive blocked prepolymer comprises a reactive blocked polyurethane prepolymer, a reactive blocked polyurea prepolymer, a reactive blocked polyurethane-polyurea copolymer, or a combination thereof.

In some embodiments, step (c) is carried out with a reactive blocking agent comprising an amine (meth)acrylate monomer blocking agent (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof).

In some embodiments, step (c) is carried out with a reactive capping agent reactive with polyisocyanate (e.g., a diol such as 2-hydroxyethyl methacrylate (HEMA)) to form the regenerated reactive prepolymer.

In some embodiments, the regenerated reactive prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the regenerated reactive prepolymer comprises a (meth)acrylate-blocked prepolymer.

In some embodiments, the reactive diluent is present and comprises an acrylate, a methacrylate, a styrene, an acrylic acid, a vinylamide, a vinyl ether, a vinyl ester, polymers containing any one or more of the foregoing, or a combination of two or more of the foregoing (e.g., acrylonitrile, styrene, divinyl benzene, vinyl toluene, methyl acrylate, ethyl acrylate, butyl acrylate, methyl (meth)acrylate, an amine (meth)acrylate, and mixtures thereof).

In some embodiments, the crosslinker is a polyfunctional acrylate or methacrylate (e.g., diethylene glycol dimethacrylate (DEGMA), triethylene glycol dimethacrylate (TEGDMA), tetraethylene glycol dimethracrylate (TeEGDMA), 1,6-hexanediol dimethacrylate (HDDMA), diurethane dimethacrylate (DUDMA), trimethylol propane trimethacrylate (TMPTMA), pol(yethylene glycol) dimethacrylate (PEGDMA), 1,6-hexanediol diacrylate (HDDA), trimethylol propane triacrylate (TMPTA), poly(ethylene glycol) diacrylate (PEGDA), etc., including mixtures of two or more thereof).

Also provided is a recyclable light-polymerizable resin useful for additive manufacturing, comprising or consisting essentially of: (i) a reactive blocked prepolymer (e.g., a reactive blocked polyurethane prepolymer, a reactive blocked polyurea prepolymer, a reactive blocked polyurethane-polyurea copolymer, or a combination thereof); (ii) a crosslinker (e.g., in an amount of from 1% to 5% by weight); (iii) a photoinitiator; (iv) optionally a reactive diluent; (v) optionally a light absorber; (vi) optionally pigments and/or dyes; and (vii) optionally at least one filler.

In some embodiments, the reactive blocked prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the reactive blocked prepolymer comprises a (meth)acrylate-blocked prepolymer.

In some embodiments, the crosslinker is a polyfunctional acrylate or methacrylate (e.g., diethylene glycol dimethacrylate (DEGMA), triethylene glycol dimethacrylate (TEGDMA), tetraethylene glycol dimethracrylate (TeEGDMA), 1,6-hexanediol dimethacrylate (HDDMA), diurethane dimethacrylate (DUDMA), trimethylol propane trimethacrylate (TMPTMA), pol(yethylene glycol) dimethacrylate (PEGDMA), 1,6-hexanediol diacrylate (HDDA), trimethylol propane triacrylate (TMPTA), poly(ethylene glyocol) diacrylate (PEGDA), etc., including mixtures of two or more thereof).

In some embodiments, the reactive diluent is present and comprises an acrylate, a methacrylate, a styrene, an acrylic acid, a vinylamide, a vinyl ether, a vinyl ester, polymers containing any one or more of the foregoing, or a combination of two or more of the foregoing (e.g., acrylonitrile, styrene, divinyl benzene, vinyl toluene, methyl acrylate, ethyl acrylate, butyl acrylate, methyl (meth)acrylate, an amine (meth)acrylate, and mixtures thereof).

Further provided is a method of making a recyclable object by additive manufacturing, comprising: (a) providing a resin as taught herein; (b) producing said object (e.g., a dental model) by light polymerizing said resin in an additive manufacturing process (e.g., bottom-up or top-down stereolithography); and (c) optionally, comminuting said object (e.g., by grinding such as cryo-milling, shredding, chopping, or pelletizing) to form a particulate material useful for the recovery of a regenerated reactive prepolymer.

Also provided is a sustainable manufacturing method, comprising the steps of (a) shipping a recyclable light-polymerizable resin (e.g., a resin as taught herein) to at least one user (e.g., a plurality of users); (b) collecting objects produced from said resin (e.g., by additive manufacturing, such as by bottom-up or top-down stereolithography) back from said at least one user; and (c) processing said objects to recover a regenerated reactive prepolymer (e.g., by a method as taught herein).

The foregoing and other objects and aspects of the present invention are explained in greater detail in the specification set forth below. The disclosures of all United States patent references cited herein are to be incorporated herein by reference.

DETAILED DESCRIPTION OF ILLUSTRATIVE EMBODIMENTS

Figure 1:
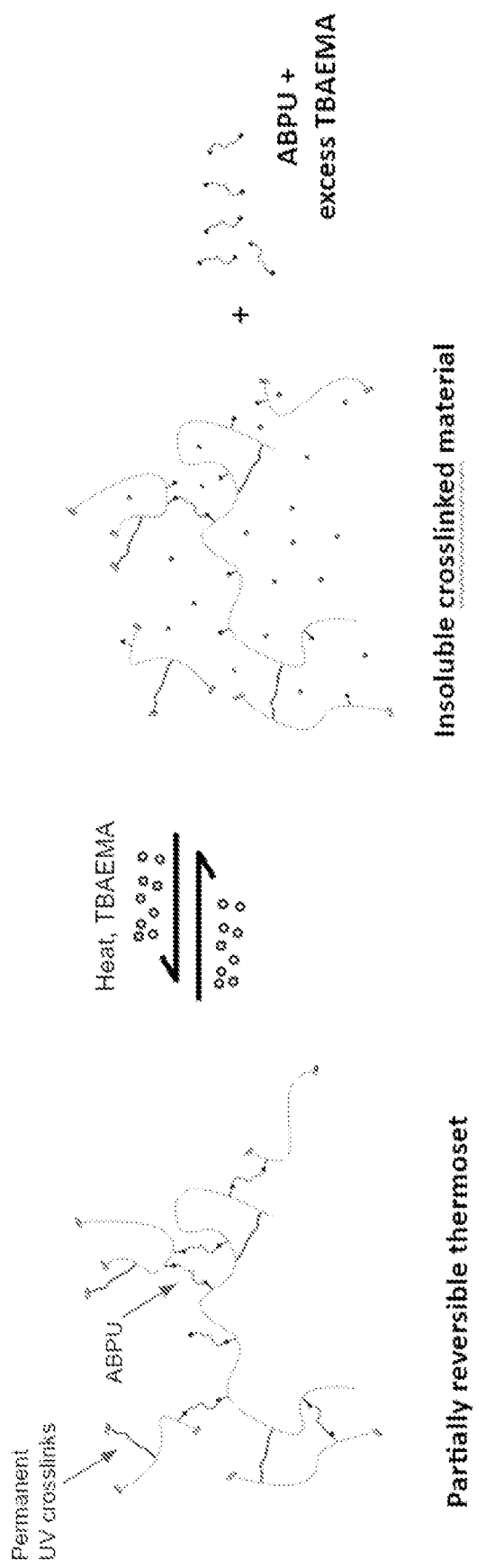
FIG. 1 presents an example scheme of a partially reversible thermoset formed from UV crosslinking of ABPU and permanent crosslinkers, and separation of soluble ABPU from the insoluble crosslinked polymer network after heat treatment with the reactive blocking agent TBAEMA.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. The disclosures of US patents and patent publications cited herein are to be incorporated by reference to the extent consistent with the present disclosure.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof. The sequence of operations (or steps) is not limited to the order presented in the claims or figures unless specifically indicated otherwise.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

The transitional phrase "consisting essentially of" means that the scope of a claim is to be interpreted to encompass the specified materials or steps recited, and also additional materials or steps that do not materially affect the basic and novel characteristics of the claimed invention as described herein.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. Furthermore, a first, second, third, etc. component or material may be the same as or different from one another.

It will also be understood that an "additional" component or material may be the same as or different from the component or material previously used. For example, additional reactive diluent may be the same reactive diluent as used in a prior step, or it may be a different reactive diluent that is added, without departing from the teachings of the present invention. If the prior component or material was optional, the "additional" component or material may be the first or only instance of that component or material.

"ABPU" or "reactive blocked polyurethane" as used herein refers to UV-curable, (meth)acrylate blocked, polyurethane/polyurea with blocked isocyanate groups such as described in U.S. Pat. Nos. 9,453,142 and 9,598,606 to Rolland et al. A particular example of a suitable reactive (or UV-curable) blocking agent for the isocyanates of the ABPU is a tertiary amine-containing (meth)acrylate (e.g., t-butylaminoethyl methacrylate, TBAEMA, tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof).

In some embodiments, non-reactive blocked polyurethane may be further provided in the composition, inclusive of an ABPU that has at least one end that is blocked by a non-reactive group (while another end is reactive). Such non-reactive blocking groups may include, for example, volatile blocking groups such as 3,5-dimethylpyrazole (DMP), 2-butanone oxime (also called methyl ethyl ketoxime or "MEKO"), etc. See, e.g., WO 2018/226943 to Chen et al.

In some embodiments, an excess of the blocking agent (reactive or non-reactive) may be removed from the composition by distillation or chromatography, if desired.

Polyisocyanates (including diisocyanates) useful in carrying out the present invention include, but are not limited to, 1,1'-methylenebis(4-isocyanatobenzene) (MDI), 2,4-diisocyanato-1-methylbenzene (TDI), methylene-bis(4-cyclohexylisocyanate) ($H_{12}$MDI), hexamethylene diisocyanate (HDI), isophorone diisocyanate (IPDI), polymeric MDI, 1,4-phenylene diisocyanate (PPDI), and o-tolidine diisocyanate (TODI). In some embodiments, a preferred diisocyanate is $H_{12}$MDI, such as Desmodur W, supplied by Covestro AG. Additional examples include but are not limited to those given in U.S. Pat. No. 3,694,389 to Levy.

Reactive blocking agents useful in the present invention include agents that reversibly block isocyantes and also contain one or more groups that are UV polymerizable, such as amine (meth)acrylate monomer blocking agents (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof). See, e.g., US Patent Application Publication No. 20130202392. There are, however, many blocking agents for isocyanate, and those skilled in the art can couple (meth)acrylate groups to other blocking agents to create additional blocking agents that can be used to carry out the present invention. Still further, those skilled in the art can use maleimide, or substitute maleimide on other known blocking agents, for use in the present invention.

Reactive capping agents useful in the present invention are generally agents containing one or more groups reactive with polyisocyantes, and one or more groups that are UV polymerizable, including hydroxyl or amine (meth)acrylate monomer capping agents. Examples of suitable capping agents include, but are not limited to, 2-hydroxyethyl acrylate, 2-hydroxylethyl methacrylate (HEMA), hydroxypropyl acrylate, hydroxypropyl methacrylate, tert-butylaminoethyl methacrylate, 4-hydroxybutyl acrylate, 3-phenoxy 2-hydroxypropyl methacrylate, glycerol methacrylate, etc. Additional examples include, but are not limited to, butane monohydroxy monoacrylate, polypropylene glycol monoacrylate, caprolactone monohydroxy monoacrylate, 2-terbutylaminoethylmethacrylate and 2-terbutylaminoethylacrylate. See EP 0525578 A1 to Peiffer, and U.S. Pat. No. 7,279,505 to Phelan et al., which are incorporated by reference herein.

Photoinitiators useful in the present invention include, but are not limited to, diphenyl(2,4,6-trimethylbenzoyl)phosphine oxide (TPO), Phenylbis(2,4,6-trimethylbenzoyl)phosphine oxide (PPO), 2-isopropylthioxanthone and/or 4-isopropylthioxanthone (ITX), etc.

"Diluents" as used herein includes both UV-curable diluents (for example monoacrylates, mono-methacrylates, polyacrylates, polymethacrylates, acrylamides, methacrylamides, etc.), and non-UV-curable diluents (for example, plasticizers such as bis(2-ethylhexyl) phthalate, bis(2-propylheptyl) phthalate, diisononyl phthalate, tri-(2-ethylhexyl) trimellitate, bis(2-ethylhexyl) adipate, diisononyl adipate, dibutyl sebacate, diisobutyl maleate, etc.).

"Solvents" as used herein includes, for example, xylenes, diethyl ether, tetrahydrofuran (THF), ethyl acetate, benzene, toluene, N,N-dimethylformamide, propylene carbonate, dimethyl carbonate, etc. Solvents may also include an excess of blocking agent and/or capping agent, such as TBAEMA and/or HEMA.

"Crosslinkers" as used herein includes UV reactive crosslinkers, such as polyfunctional acrylates and methacrylates, for example, diethylene glycol dimethacrylate (DEGMA), triethylene glycol dimethacrylate (TEGDMA), tetraethylene glycol dimethracrylate (TeEGDMA), 1,6-hexanediol dimethacrylate (HDDMA), diurethane dimethacrylate (DUDMA), trimethylol propane trimethacrylate (TMPTMA), pol(yethylene glycol) dimethacrylate (PEGDMA), 1,6-hexanediol diacrylate (HDDA), trimethylol propane triacrylate (TMPTA), poly(ethylene glyocol) diacrylate (PEGDA), etc., including mixtures of two or more thereof.

A "radical polymerization inhibitor" includes, but is not limited to, 4-methoxyphenol (also known as monomethyl ether hydroquinone (MEHQ), or mequinol), 4-ethoxyphenol, 4-propoxyphenol, 4-butoxyphenol 4-heptoxyphenol, 2,6-di-tert-butyl-4-methylphenol (see, e.g., U.S. Pat. No. 9,796,693), etc., including combinations thereof.

"Shipping" and "collecting" as used herein may be performed by any method of transferring, delivering, or providing, whether directly or through an intermediary. "User" refers to a location, such as a manufacturing or production facility at which objects are produced from the resin, remote or separate from the location from which the resin is shipped, or to which an object may be sent for collection, which location may be operated by the same corporate entity, or by a different corporate entity, from the location from which the resin is shipped. Likewise, a "plurality of users" may be different sites or locations operated by the same corporate entity, or operated by different corporate entities.

1. Single-Cure Additive Manufacturing Resins Containing ABPUs.

Dual cure additive manufacturing resins containing ABPUs are described in, for example, U.S. Pat. Nos. 9,453,142 and 9,598,606 to Rolland et al., which are incorporated by reference herein. In the present invention, the resin can consist essentially of the same ingredients as found in such a dual cure resin, but with at least one constituent required for the second or subsequent cure (e.g., the chain extender(s)) omitted or substantially omitted.

A. Light-polymerizable monomers and/or prepolymers. Sometimes also referred to as "Part A" of a dual cure resin, these are monomers and/or prepolymers that can be polymerized by exposure to actinic radiation or light. This resin can comprise difunctional or polyfunctional monomers, but can also include monofunctional monomers (to act as "chain stoppers" to control molecular weight). In contrast to a dual cure resin, where the amount of this "Part A" corresponds to 50 to 90% by weight of the total resin (polymerizable liquid) composition, in the present invention these light-polymerizable components correspond to more than 90 or 95 percent by weight of the total resin composition.

Examples of reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

Note that, in the present invention, the light polymerizable component, once polymerized, is one which can partially degrade/decrosslink upon heating or baking and, in the presence of a reactive blocking or reactive capping agent, regenerate a reactive prepolymer such as an ABPU. The regenerated reactive prepolymer can be separated from the remainder of the polymerized material, which is an insoluble crosslinked material having permanent UV crosslinks that are stable in the presence of the blocking agent or capping agent and/or solvent during the heating and extraction. This is schematically illustrated in FIG. 1.

In a typical "dual cure" additive manufacturing resin, the additional part B thermally reactive components (e.g., chain extenders) are carried in the green, light cured, object, where they participate in a subsequent cure to impart desired physical properties to the object. In the present invention, these components are left out, and the reactive prepolymer Part A component is regenerated by heating the formed blocked polymer in the presence of additional blocking agents or capping agents, which may be followed by extraction and recovery of the regenerated component. As will be understood, the "regenerated" reactive prepolymer may be the same as or different from the reactive prepolymer use for light polymerization, depending upon the blocking agent or capping agent used.

B. Additional resin ingredients. Photoinitiators included in the polymerizable liquid (resin) can be any suitable photoinitiator, including type I and type II photoinitiators and including commonly used UV photoinitiators, examples of which include but are not limited to acetophenones (diethoxyacetophenone for example), phosphine oxides such as diphenyl(2,4,6-trimethylbenzoyl)phosphine oxide, phenylbis(2,4,6-trimethylbenzoyl) phosphine oxide (PPO), Irgacure® 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including, for example, pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers; siloxanes; acrylonitrile-butadiene rubbers; reactive and non-reactive thermoplastics (including but not limited to: poly(ether imides), maleimide-styrene terpolymers, polyarylates, polysulfones and polyethersulfones, etc.); inorganic fillers such as silicates (such as talc, clays, silica, mica), glass, carbon nanotubes, graphene, cellulose nanocrystals, etc.; including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (µm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Organic diluents. In some embodiments, diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, isobornyl methacrylate, TBAEMA (tert-butyl amino ethyl methacrylate), tetrahydrofurfuryl methacrylate, N,N-dimethylacrylamide, N-vinyl-2-pyrrolidone, and N-vinyl formamide, or a mixture of two or more thereof. The diluent may be included in the polymerizable liquid in any suitable amount, typically from 1, 5 or 10 percent by weight, up to about 30 or 40 percent by weight, or more.

2. Additive Manufacturing.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Januszewcz et al., Layerless fabrication with continuous liquid interface production, *Proc. Natl. Acad. Sci. USA* 113, 11703-11708 (2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234), generating oxygen as an inhibitor by electrolysis (see I. Craven et al., WO 2016/133759), and incorporating magnetically positionable particles to which the photoactivator is coupled into the polymerizable liquid (see J. Rolland, WO 2016/145182).

Other examples of methods and apparatus for carrying out particular embodiments of CLIP include, but are not limited to, those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., Continuous liquid interface production system with viscosity pump, US Patent Application Pub. No. US 2017/0129169; Sun and Lichkus, Three-dimensional fabricating system for rapidly producing objects, US Patent Application Pub. No. US 2016/0288376; Willis et al., 3d print adhesion reduction during cure process, US Patent Application Pub. No. US 2015/0360419; Lin et al., Intelligent 3d printing through optimization of 3d print parameters, US Patent Application Pub. No. US 2015/0331402; and D. Castanon, Stereolithography System, US Patent Application Pub. No. US 2017/0129167.

3. Recovery of Part a Components from Additively Manufactured Objects.

As shown in the scheme presented in FIG. 1, a three-dimensional thermoset object or article may be formed by additive manufacturing such as stereolithography that includes polymer backbones (e.g., poly(methacrylate)) crosslinked with ABPUs and also including permanent (i.e., not heat labile) crosslinks. Alternatively, the material to be recycled may be recovered coating material formed from a first resin and produced by a light-cured coating process. The resin used to form the preformed article or coating may comprise or consist essentially of: (i) a reactive blocked prepolymer (e.g., ABPU); (ii) a UV reactive crosslinker (e.g., polyfunctional (meth)acrylate crosslinker); (iii) a photoinitiator; (iv) optionally a reactive diluent; (v) optionally a light absorber; (vi) optionally pigments and/or dyes; and (vii) optionally at least one filler; said preformed article (or coating) comprised of at least 70, 80 or 90 percent by weight of a crosslinked polymer, said crosslinked polymer consisting essentially of said reactive blocked prepolymer, said crosslinker, and said reactive diluent when included, in light polymerized, cross-linked, thermoset form.

The article (or recovered coating) may then be: (b) comminuted into a reactive particulate material (e.g., by grinding such as cryo-milling, shredding, chopping, or pelletizing); and (c) combined (e.g., in an amount of from 1, 2 or 4 percent by weight to 20, 25, or 30 percent by weight, or more) with a reactive blocking agent or reactive capping agent to form a mixture and heating said mixture (e.g., to a temperature of from 40, 60 or 700 Celsius to 90, 100, or 1200 Celsius, or more) for a time sufficient to form a regenerated reactive prepolymer.

The regenerated reactive prepolymer may be extracted from the mixture into a solvent (e.g. an organic solvent such as xylenes). Example methods of extracting include, but are not limited to, 1) Batch reaction followed by continuous extraction (detailed in the examples below); 2) Eliminating solvent and using excess of blocking or capping agent in a batch-to-continuous method; 3) Multiple batch extractions to improve yield (blocking or capping agent only, or solvent and blocking or capping agent); and 4) Supercritical $CO_2$ extraction at elevated temperatures.

The recovered regenerated reactive prepolymer may thereafter be used as a component for a subsequent resin, which may be the same as or different from the original resin.

To provide a sustainable manufacturing method, the recyclable light-polymerizable resin as taught herein may be: (a) shipped to at least one user; (b) objects produced from said resin collected back from said at least one user; and (c) objects processed to recover a regenerated reactive prepolymer therefrom. The regenerated reactive prepolymer may then used as a component in a new resin (the same as or different from the original light-polymerizable resin), which may be shipped to at least one user (same or different users).

In some embodiments, the objects comprise dental models.

In some embodiments, the at least one user comprises a plurality of users (same or different users).

The present invention is explained in greater detail in the following non-limiting Examples.

EXAMPLES

Figure 2:
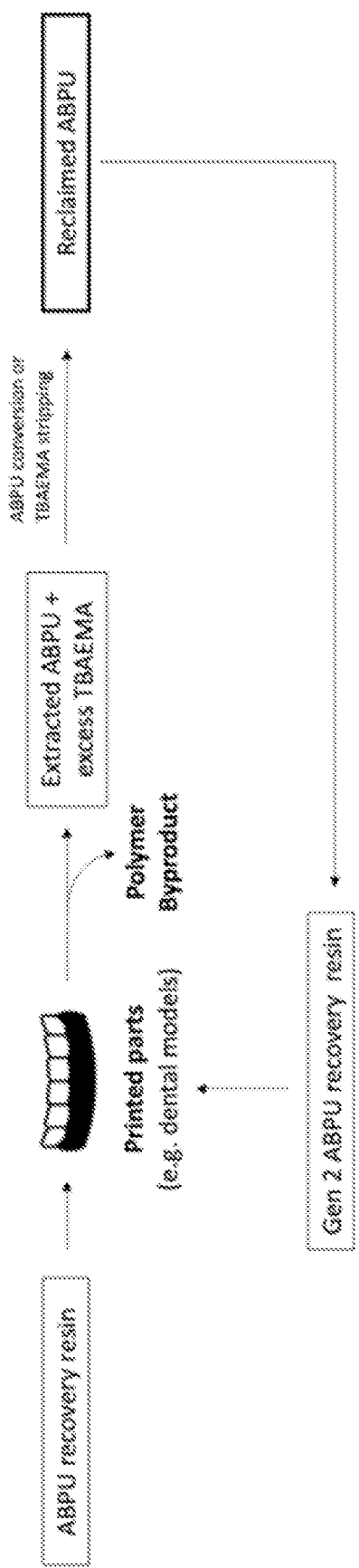
FIG. 2 presents an example scheme of a process flow for ABPU recovery and reuse from a resin as taught herein.

The procedure illustrated in FIG. 2 is used for extracting the raw material (ABPU) from a recyclable formulation, referred to as ABPU Recovery Resin (ARR), using a so-called 'batch' and 'continuous' (Soxhlet) extraction method.
ARR Formulation:

| Ingredient | Loading (wt %) |
|---|---|
| ABPU (with 10 wt % benzyl methacrylate) | 83.3 |
| Benzyl methacrylate (reactive diluent) | 12.2 |
| DEGDMA (crosslinker) | 2.0 |
| TPO (photoinitiator) | 2.5 |

After printing or casting ARR, the parts are cut into 1 inch pieces and comminuted by using a freezer mill. This process yields granules of an average particle size of 500-2000 microns. The powder is typically stored in a desiccator overnight to prevent moisture contamination.
Batch Extraction The batch extraction procedure is carried out by adding the dried powder, xylenes, and TBAEMA into a 60 mL vial. The TBAEMA is loaded with a 2 eq. amount relative to the chain ends. Butylated hydroxytoluene (BHT) is used as an antioxidant stabilizer.

| Component | Amount (g) |
|---|---|
| ARR powder | 3.00 |
| Xylenes (solvent) | 14.37 |
| TBAEMA (500 ppm BHT inhibitor) | 1.35 |

The contents of the vial are heated to 120° C. for a period of 4 hours. During this time, the powder will swell in the solvent making stirring with a stir bar impossible.

Continuous Extraction

After these 4 hours, the contents of the vial are transferred to a Soxhlet cellulose thimble. Roughly 10 g of THF are added to the vial to improve the yield. This THF amount is added to the thimble as well. The thimble is placed in the Soxhlet chamber (together with the 10 g THF). The round bottom flask is filled with 130 g of THF and a stir bar and the Soxhlet extractor is assembled and placed in an oil bath. The bath will be heated to 100° C. for 90 min.

| Component | Notes |
|---|---|
| Thimble | Cellulose-based, tare before use |
| Round bottom flask (RBF) | 250 mL, clean before use and tare before use |
| Soxhlet chamber | Clean before use |
| Condenser | Ensure condenser is working and clean before use |

All the solvents are collected in the RBF after the Soxhlet extraction is finished. BHT is added to the solution in a 500 ppm loading. All the solvents are removed in vacuo. Methanol is added to the mixture to remove xylenes via the azeotrope. The remaining powder can be dried in vacuo as well. This is typically done at 60° C. overnight. After removing the solvents from the extract, a GPC trace is taken and a TBAEMA titration is performed.

The foregoing is illustrative of the present invention, and is not to be construed as limiting thereof. The invention is defined by the following claims, with equivalents of the claims to be included therein.

We claim:

1. A method of recycling a thermoset material, comprising:
    (a) providing the thermoset material, wherein said thermoset material is produced by the process of light polymerizing a single-cure resin in an additive manufacturing or coating process, said resin comprising:
        (i) a reactive blocked prepolymer;
        (ii) a crosslinker;
        (iii) a photoinitiator;
        (iv) optionally a reactive diluent;
        (v) optionally a light absorber;
        (vi) optionally pigments and/or dyes; and
        (vii) optionally at least one filler;
        said thermoset material comprised of at least 70 percent by weight of a crosslinked polymer, said crosslinked polymer consisting essentially of said reactive blocked prepolymer, said crosslinker, and said reactive diluent when included, in light polymerized, cross-linked form;
    (b) comminuting said thermoset material into a particulate material; and
    (c) combining said particulate material with a reactive blocking agent or reactive capping agent to form a mixture, and heating said mixture for a time sufficient to form a regenerated reactive prepolymer.

2. The method of claim 1, further comprising:
    (d) extracting said regenerated reactive prepolymer from said mixture into a solvent.

3. The method of claim 1, wherein the regenerated reactive prepolymer is a reactive blocked prepolymer.

4. The method of claim 3, wherein said reactive blocked prepolymer comprises a reactive blocked polyurethane prepolymer, a reactive blocked polyurea prepolymer, a reactive blocked polyurethane-polyurea copolymer, or a combination thereof.

5. The method of claim 1, wherein said step (c) is carried out with a reactive blocking agent comprising an amine (meth)acrylate monomer blocking agent.

6. The method of claim 1, wherein said step (c) is carried out with a reactive capping agent reactive with polyisocyanate to form the regenerated reactive prepolymer.

7. The method of claim 1, wherein said regenerated reactive prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

8. The method of claim 1, wherein said regenerated reactive prepolymer comprises a (meth)acrylate-blocked prepolymer.

9. The method of claim 1, wherein said reactive diluent is present and comprises one or more groups selected from an acrylate, a methacrylate, a styrene, an acrylic acid, a vinylamide, a vinyl ether, and a vinyl ester.

10. The method of claim 1, wherein said crosslinker is a polyfunctional acrylate or methacrylate.

11. The method of claim 1, wherein said thermoset material is an additively manufactured article.

12. The method of claim 11, wherein said additively manufactured article is a dental model.

13. The method of claim 1, wherein said thermoset material is a recovered coating material.

14. The method of claim 1, wherein said step of comminuting is carried out by cryo-milling, shredding, chopping, or pelletizing.

15. The method of claim 3, wherein the reactive blocked prepolymer is a (meth)acrylate-blocked polyurethane (ABPU).

16. The method of claim 5, wherein the reactive blocking agent is selected from the group consisting of tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof.

17. The method of claim 6, wherein said reactive capping agent is a diol.

18. The method of claim 6, wherein said reactive capping agent is 2-hydroxyethyl methacrylate (HEMA).

19. The method of claim 9, wherein said reactive diluent is selected from the group consisting of acrylonitrile, styrene, divinyl benzene, vinyl toluene, methyl acrylate, ethyl acrylate, butyl acrylate, methyl (meth)acrylate, an amine (meth)acrylate, and mixtures thereof.

20. The method of claim 10, wherein said crosslinker is selected from the group consisting of diethylene glycol dimethacrylate (DEGMA), triethylene glycol dimethacrylate (TEGDMA), tetraethylene glycol dimethracrylate (TeEGDMA), 1,6-hexanediol dimethacrylate (HDDMA), diurethane dimethacrylate (DUDMA), trimethylol propane trimethacrylate (TMPTMA), poly(ethylene glycol) dimethacrylate (PEGDMA), 1,6-hexanediol diacrylate (HDDA), trimethylol propane triacrylate (TMPTA), poly(ethylene glycol) diacrylate (PEGDA), and a mixture of two or more thereof.

* * * * *